United States Patent
Molsom et al.

(10) Patent No.: US 11,459,034 B2
(45) Date of Patent: Oct. 4, 2022

(54) UNDERCARRIAGE

(71) Applicant: J.C. BAMFORD EXCAVATORS LIMITED, Uttoxeter (GB)

(72) Inventors: Martyn Molsom, Uttoxeter (GB); Christopher Jack Streat, Uttoxeter (GB); Stephen Saxby, Etwall (GB)

(73) Assignee: J.C. BAMFORD EXCAVATORS LIMITED, Uttoxeter (GB)

( * ) Notice: Subject to any disclaimer, the term of this patent is extended or adjusted under 35 U.S.C. 154(b) by 0 days.

(21) Appl. No.: 17/153,860

(22) Filed: Jan. 20, 2021

(65) Prior Publication Data
US 2022/0227423 A1 Jul. 21, 2022

(51) Int. Cl.
*B62D 21/18* (2006.01)
*B62D 33/06* (2006.01)

(52) U.S. Cl.
CPC ....... *B62D 21/186* (2013.01); *B62D 33/0617* (2013.01)

(58) Field of Classification Search
CPC .. B62D 21/186; B62D 33/0617; B60B 35/16; B60B 35/00; B60B 35/166; B60B 35/005; B60B 35/006; B60Y 2200/41
See application file for complete search history.

(56) References Cited

U.S. PATENT DOCUMENTS

| | | | |
|---|---|---|---|
| 4,135,597 A | 1/1979 | Barth | |
| 4,167,982 A * | 9/1979 | Ishioka | B62D 21/186 180/291 |
| 4,342,470 A * | 8/1982 | Matsuda | B66F 9/07513 280/785 |
| 4,545,452 A * | 10/1985 | Moring | B23K 9/0026 180/378 |
| 4,807,374 A * | 2/1989 | Kasberger | E02F 9/028 37/443 |
| 5,971,413 A * | 10/1999 | El-Kassouf | B60B 35/006 180/360 |
| 6,089,343 A * | 7/2000 | Brewer | B62D 21/186 180/291 |

(Continued)

FOREIGN PATENT DOCUMENTS

| | | | | |
|---|---|---|---|---|
| EP | 0 000 281 A1 | 1/1979 | | |
| EP | 0000281 A1 * | 1/1979 | ........... | B62D 21/186 |

(Continued)

OTHER PUBLICATIONS

Search Report for GB 2000796.9, dated Jul. 14, 2020.
Extended European Search Report for EP 21 15 2022, dated May 26, 2021.

*Primary Examiner* — Paul N Dickson
*Assistant Examiner* — Kurtis Nielson
(74) *Attorney, Agent, or Firm* — Marshall, Gerstein & Borun LLP (57) ABSTRACT

An undercarriage for a working machine having a chassis. The chassis includes a first axle mount and a first axle assembly mounted to the first axle mount. The first axle assembly has a first axle with first and second ends for pivotably mounting first and second wheels. The first axle mount is provided in the form of first and second arms extending from the chassis to define a channel therebetween, and the undercarriage is configured to restrict movement of the first and second arms.

19 Claims, 4 Drawing Sheets

(56) References Cited

U.S. PATENT DOCUMENTS

| | | | |
|---|---|---|---|
| 2006/0011396 A1* | 1/2006 | Iwamoto | B66F 9/07513 |
| | | | 180/68.1 |
| 2013/0187360 A1 | 7/2013 | Springer et al. | |
| 2015/0321513 A1* | 11/2015 | Czanstke | F16B 7/0433 |
| | | | 301/132 |
| 2016/0121721 A1* | 5/2016 | Lyle | E02F 9/121 |
| | | | 180/243 |
| 2016/0122972 A1* | 5/2016 | Price | E02F 3/325 |
| | | | 180/312 |
| 2017/0129284 A1* | 5/2017 | Tomimatsu | B62D 49/00 |
| 2017/0369097 A1* | 12/2017 | Umemoto | A01B 69/007 |
| 2019/0141884 A1* | 5/2019 | Pilney | A01M 7/0082 |
| | | | 180/209 |
| 2019/0210406 A1* | 7/2019 | Amundson | B60B 35/109 |

FOREIGN PATENT DOCUMENTS

| | | | | |
|---|---|---|---|---|
| EP | 3 023 551 A1 | | 5/2016 | |
| EP | 3851587 A1 | * | 7/2021 | ............... E02F 9/00 |
| FR | 2540795 A1 | * | 8/1984 | ............ B62D 49/06 |
| GB | 1 329 805 A | | 9/1973 | |
| JP | H07329814 A | | 12/1995 | |
| JP | 2011 012512 A | | 1/2011 | |
| JP | 2011012512 A | * | 1/2011 | |

\* cited by examiner

UNDERCARRIAGE

FIELD

The present teachings relate to an undercarriage for a working machine, and to a working machine.

BACKGROUND

Various types of working machines are known such as excavators (e.g. slew excavators), telehandlers and backhoe loaders. Such machines may typically be used for soil-shifting operations (e.g. trenching, grading, and loading) and materials handling (e.g. depositing aggregate in trenches, lifting materials and placing them on an elevated platform). If the working machine uses wheels for propulsion, a steering arrangement is used for steering either two or four wheels.

The wheels will be mounted to an undercarriage of the working machine via an undercarriage chassis. During a working operation, stabiliser legs and/or a dozer blade may be used to raise the wheels off the ground, so as to stabilise the working machine during the operation. The working operation may impart significant loads onto the chassis of the undercarriage, which may result in distortion and/or buckling of the undercarriage chassis.

The present teachings seek to overcome or at least mitigate one or more problems associated with the prior art.

SUMMARY

A first aspect of the teachings provides an undercarriage for a working machine, the undercarriage comprising: a chassis comprising a first axle mount; and a first axle assembly mounted to the first axle mount, the first axle assembly comprising a first axle having first and second ends for pivotably mounting first and second wheels thereon, wherein the first axle mount comprises first and second arms extending from the chassis to define a channel therebetween for receiving the first axle therein, and wherein the undercarriage comprises a linkage member configured to restrict movement of the first and second arms.

During working operations such as excavating or soil shifting the undercarriage may be raised off the ground via a dozer or stabiliser legs to provide stability. As the axle mount is provided in the form of two cantilevered arms extending from the main chassis, the reaction forces imparted from the ground during these working operations can result in relative movement between the arms, which can have a detrimental effect on the mounting of the axle to the chassis.

Typically, in order to restrict movement of the first and second arms, the thickness of the chassis in the end region would be increased so as to increase the rigidity of the first and second cantilevered arms. By configuring the undercarriage to restrict relative movement of the arms via a linkage member, the effect of the reaction forces on the chassis can be mitigated without needing to increase the thickness of the chassis body, thus reducing the material used and so the weight of the undercarriage.

The linkage member may extend between the first and second arms to restrict movement of the first and second arms.

Providing a linkage member that extends between the first and second arms (i.e. that is in direct contact with both the first and second arms) effectively ties the two cantilevered arms together so as to restrict/prevent relative movement therebetween.

The linkage member may be configured to abut against outer surfaces of the first and second arms.

This arrangement works to prevent the first and second arms from moving apart under imparted loads.

The linkage member may comprise an abutment plate for abutting against an outer surface of the first arm or second arm.

The provision of an abutment plate helps to spread the load applied to the first arm, thus helping to prevent local deformations.

The abutment plate may comprise one or more reinforcing ribs.

The linkage member may comprise a threaded region for receiving a removable fastener thereon for abutting against an outer surface of the first arm or second arm.

The provision of a second abutment surface provided in the form of a removable fastener aids in the assembly of the undercarriage, and in particular in the mounting of an axle to the chassis.

The linkage member may be configured to mount the first axle to the first axle mount.

This provides a compact arrangement of the axle assembly by providing a single linkage member that is able to mount the axle to the chassis whilst restricting relative movement between the first and second arms.

The linkage member may releasably mount the first axle to the first axle mount.

This enables the first axle mount to be removable mounted to the chassis, e.g. for maintenance.

The linkage member may extend through the first axle.

The linkage member may be provided in the form of an axle pin.

The first arm may be provided at or near a first end of the chassis and comprises an auxiliary mounting arrangement for mounting a dozer blade or stabiliser arms to the chassis.

The chassis may comprise a second axle mount. The undercarriage may comprise a second axle assembly mounted to the second axle mount, the second axle assembly comprising a second axle having first and second ends for pivotably mounting first and second wheels thereon.

The second axle mount may comprise third and fourth arms extending from the chassis to define a channel therebetween for receiving the second axle therein. The undercarriage may comprise a second linkage member configured to restrict movement of the third and fourth arms.

The second linkage member may extend between the third and fourth arms to restrict movement of the third and fourth arms.

Providing a linkage member that extends between the first and second arms (i.e. that is in direct contact with both the first and second arms) effectively ties the two cantilevered arms together so as to restrict/prevent relative movement therebetween.

The second linkage member may be configured to mount the second axle to the second axle mount.

This provides a compact arrangement of the axle assembly by providing a single linkage member that is able to mount the axle to the chassis whilst restricting relative movement between the third and fourth arms.

The second linkage member may releasably mount the second axle to the second axle mount.

This enables the first axle mount to be removable mounted to the chassis, e.g. for maintenance.

The second linkage member may extend through the second axle.

The second linkage member may be provided in the form of an axle pin.

The third arm may be provided at or near a first end of the chassis and may comprise an auxiliary mounting arrangement for mounting a dozer blade or stabiliser arms to the chassis.

According to a second aspect, there is provided a working machine comprising: an undercarriage comprising a chassis comprising a first axle mount, and a first axle assembly mounted to the first axle mount, the first axle assembly comprising a first axle having first and second ends for pivotably mounting first and second wheels thereon; an operator seat connected to the undercarriage, wherein the first axle mount comprises first and second arms extending from the chassis to define a channel therebetween for receiving the first axle therein, and wherein the undercarriage comprises a linkage member configured to restrict movement of the first and second arms.

The working machine may further comprise stabiliser legs and/or a dozer blade mounted to the chassis.

The working machine may further comprise a superstructure, e.g. a rotatable superstructure, connected to the undercarriage.

The working machine may further comprise a working arm mounted to the superstructure.

The working machine may further comprise an operator cab, where the operator seat is positioned within said operator cab.

The working machine may be an excavator, a loader, a dumper, a forklift or a telehandler.

BRIEF DESCRIPTION OF THE DRAWINGS

Embodiments will now be described with reference to the accompanying drawings, in which.

DETAILED DESCRIPTION OF EMBODIMENT(S)

Figure 1:
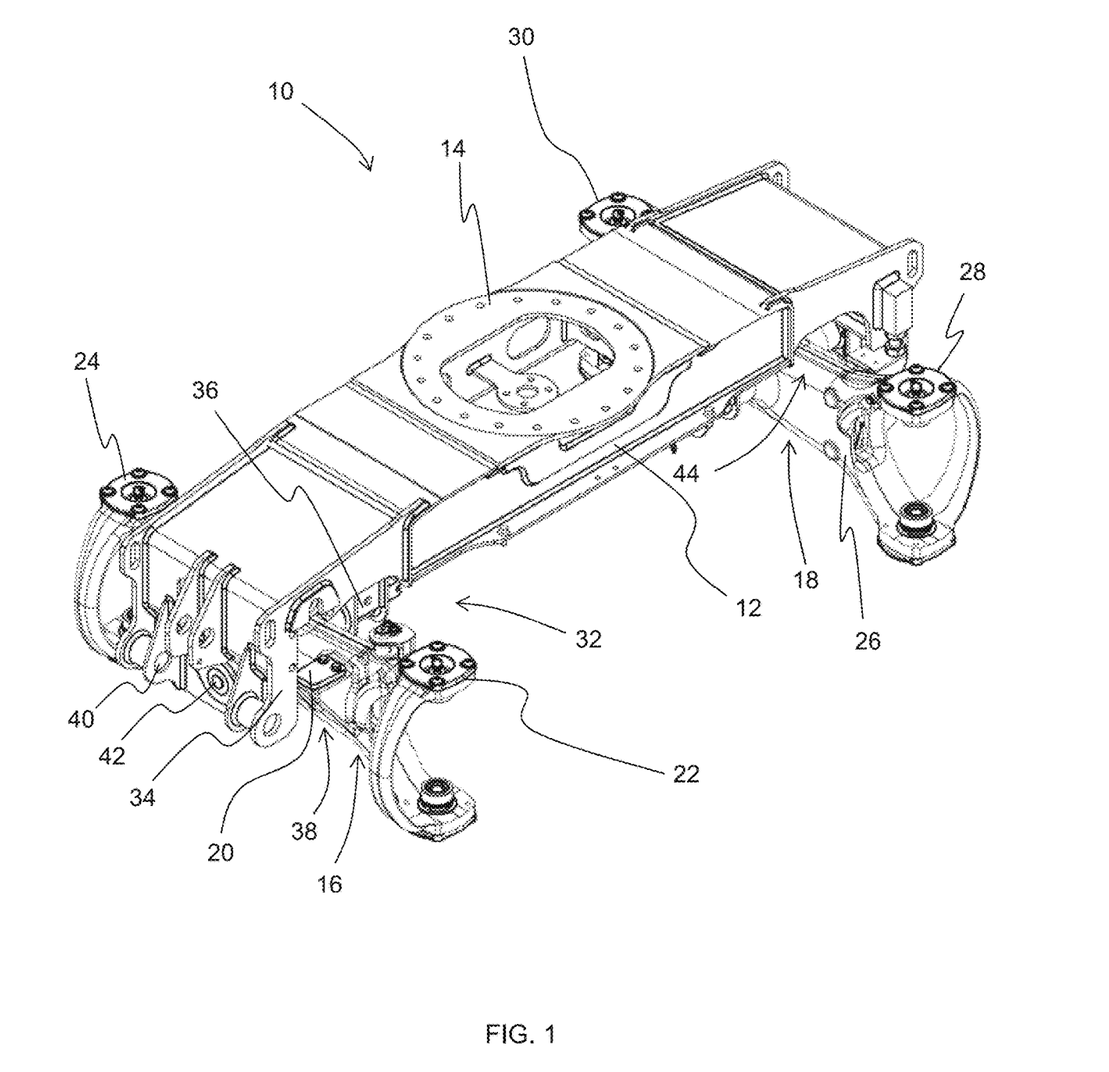
FIG. 1 is an isometric view of an undercarriage according to an embodiment.

Referring firstly to FIG. 1, an undercarriage is illustrated and is indicated generally at 10. The undercarriage 10 is formed from a chassis 12 extending fore-aft. The chassis 12 provides a majority of the strength of the undercarriage 10. The chassis 12 includes a mounting arrangement 14 for mounting a superstructure and/or an operator seat (not shown) thereon.

The undercarriage 10 is connected to a ground engaging structure, which in this embodiment includes first and second axle assemblies 16, 18 mounted to the undercarriage 10. The first and second axle assemblies 16, 18 are positioned at opposing end regions of the undercarriage 10.

The first axle assembly 16 is positioned at a first end region of the undercarriage 10. The first axle assembly 16 includes a first axle 20 having first and second ends 22, 24. The first end of the first axle 20 includes a first wheel mount (not shown) for mounting a wheel (not shown) to the first axle 20. The second end 24 of the first axle 20 includes a second wheel mount (not shown) for mounting a wheel (not shown) to the first axle 20. The first and second wheel mounts are configured such that the wheels are pivotable relative to the first axle 20, so as to be capable of steering a working machine (not shown).

The second axle assembly 18 is positioned at a second end region of the undercarriage 10. The second axle assembly 18 includes a second axle 26 having first and second ends 28, 30. The first end of the second axle 26 includes a third wheel mount (not shown) for mounting a wheel (not shown) to the second axle 26. The second end 30 of the second axle 26 includes a fourth wheel mount (not shown) for mounting a wheel (not shown) to the second axle 26. The third and fourth wheel mounts are configured such that the wheels are pivotable relative to the second axle 26, so as to be capable of steering a working machine (not shown). In order to effect steering of the wheels, the undercarriage 10 includes a steering arrangement (not shown).

In the arrangement shown, wheels are connected to the axles 20, 26, and are steerable relative to said axles 20, 26, via wheel mounts (not shown) in the form of steering hubs. The wheel mounts may be configured for mounting a motor, e.g. a hydraulic or electric motor, (not shown) for driving the respective wheel. Each motor in turn then mounts a wheel, such that the wheels are mounted to the undercarriage 10. It will be appreciated that in alternative arrangements the motors may be omitted and wheels may be connected directly to a wheel mount or steering hub in order to mount the wheels to the undercarriage 10. In such alternative arrangements, an axle shaft may be driven by a prime mover (not shown), and wheels may be rotatably fixed relative to said axle shafts such that rotation of the axle shafts drives the wheels to propel the working machine.

The first end region of the undercarriage 10 includes a mounting arrangement for mounting the first axle 20 thereto. The chassis 12 includes a mounting arrangement in the form of a first axle mount 32 for mounting the first axle 20 to the chassis 12. The first axle mount 32 includes first and second arms 34, 36 extending from the chassis. Put another way, the chassis 12 includes two cantilevered sections 34, 36 extending therefrom for mounting the first axle 20 to the chassis 12. The first and second arms 34, 36 are arranged to define a channel 38 therebetween for receiving the first axle 20. The first arm 34 is provided at a first end of the chassis 12. The first arm 34 is provided as an end plate in the arrangement illustrated.

The chassis 12 includes an auxiliary mounting arrangement 40 for mounting a dozer blade or stabiliser legs (not shown) to the chassis 12. The first auxiliary mounting arrangement 40 is provided at a first end of the chassis 12. In the arrangement shown, the first auxiliary mounting arrangement 40 is provided on the first arm 34.

The undercarriage 10 is configured to restrict relative movement between the first and second arms 34, 36. This arrangement helps to mitigate deformation of the chassis 12 (and in particular the first and second arms 34, 36), which may be caused by reaction forces imparted on the chassis 12 during working operations.

The undercarriage 10 is provided with a linkage member 42 extending between the first and second arms 34, 36 to restrict movement of the first and second arms 34, 36. Through this arrangement, a portion of the forces imparted on the undercarriage 10 during working operations are reacted through the linkage member 42 (i.e. and so are not all reacted through the first and second arms 34, 36), which helps to prevent/minimise relative movement between the first and second arms 34, 36.

In order to restrict movement of the first and second arms 34, 36 in a direction away from each other the first linkage member 42 connects the first and second arms 34, 36 together. The linkage member 42 abuts against outer surfaces of the first and second arms 34, 36 to prevent movement of the arms away from each other. In this way, the linkage member 42 sets a maximum separation/spacing between the first and second arms 34, 36.

The linkage member 42 is configured to mount the first axle 20 to the first axle mount 32. This provides a compact arrangement utilising a single component that both mounts the first axle 20 to the chassis 12 and restricts relative movement between the first and second arms 34, 36. In the arrangement shown, the linkage member 42 extends through the first axle 20. The linkage member 42 is provided in the form of a pin, e.g. an axle pin, in order to mount the first axle 20 to the chassis 12.

Figure 2:
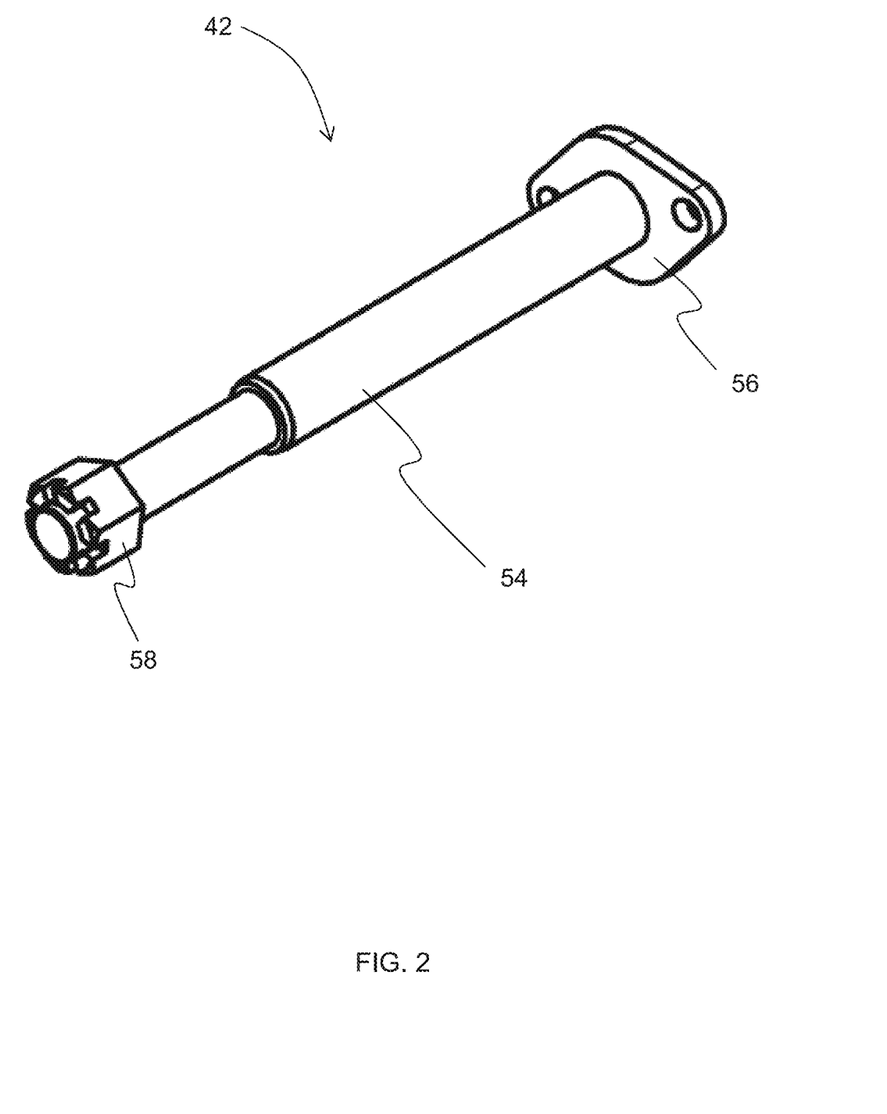
FIG. 2 is an isometric view of a linkage member of the undercarriage of FIG. 1.

Referring to FIG. 2, the linkage member 42 is illustrated in more detail. The linkage 42 includes an elongate body 54 having first and second ends. The first and second ends of the linkage member 42 are arranged so as to be able to abut against outer surfaces of the first and second arms 34, 36 to prevent outward movement of the arms away from each other.

A first end of the linkage member 42 includes an abutment plate 56 for abutting against an outer surface of the first arm 34. The abutment plate 56 may also include one or more reinforcing ribs (not shown). A second end of the linkage member 42 is threaded for receiving a removable fastener 58, e.g. a locking nut, thereon for abutting against an outer surface of the second arm 36. The provision of a second abutment surface of the linkage 42 as a removable fastener 58 aids in the assembly/disassembly of an axle to the chassis 12. In alternative arrangements the linkage member 42 may not include the abutment plate and may instead include a removable fastener at both the first and second ends thereof. It will be appreciated that any suitable arrangement of linkage member 42 that is capable of restricting/limiting outward movement of the first and second arms 34, 36 may be used.

Figure 3:
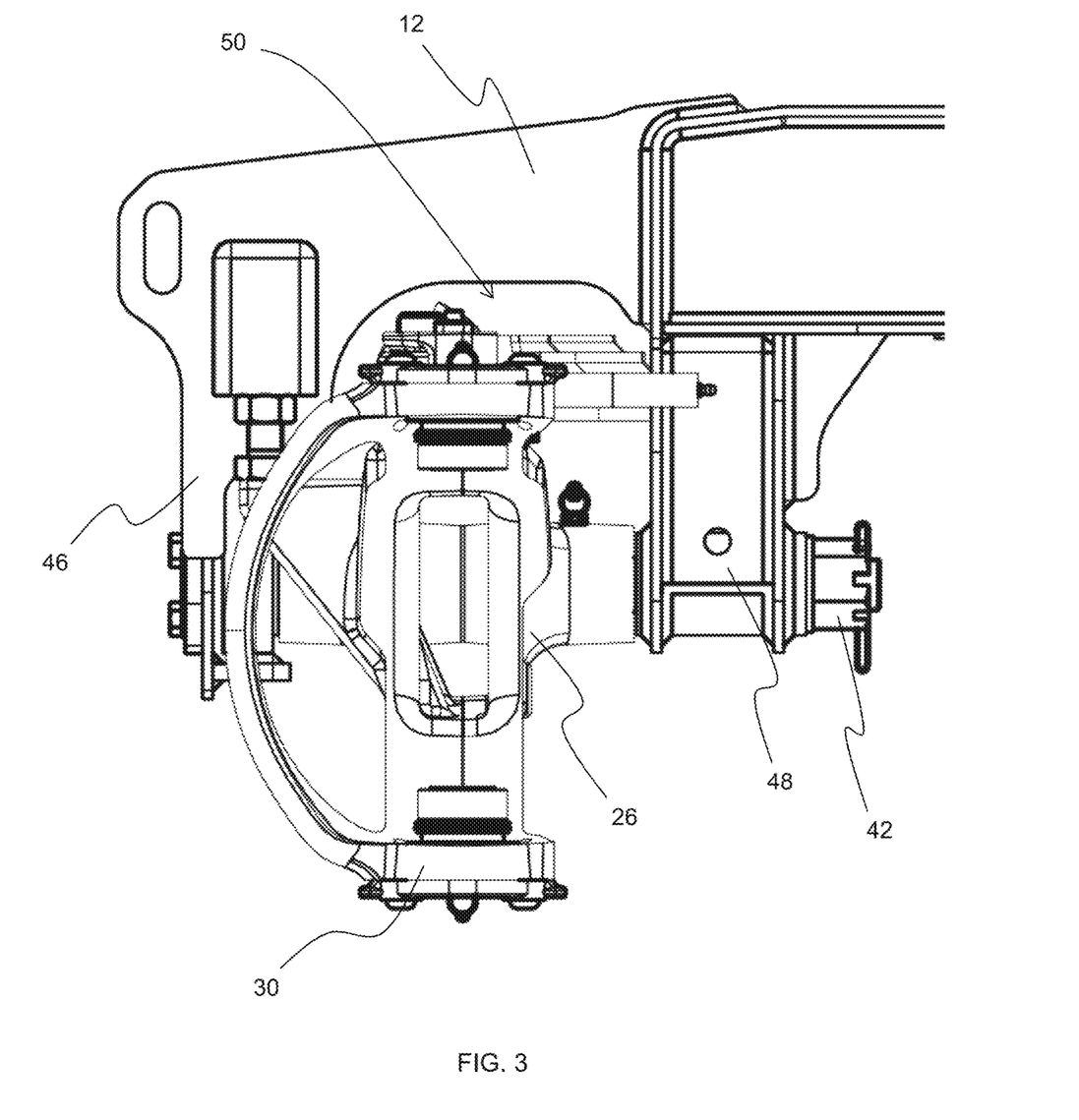
FIG. 3 is a side view of an end region of the undercarriage of FIG. 1.

Referring to FIG. 3, the second end region of the undercarriage 10 includes a mounting arrangement for mounting the second axle 26 thereto. The chassis 12 includes a mounting arrangement in the form of a second axle mount 44 for mounting the second axle 26 to the chassis 12.

The second axle mount 44 includes third and fourth arms 46, 48 extending from the chassis 12. Put another way, the chassis 12 includes two cantilevered sections 46, 48 extending therefrom for mounting the second axle 26 to the chassis 12. The third and fourth arms 46, 48 are arranged to define a channel 50 therebetween for receiving the second axle 26. The third arm 46 is provided at a second end of the chassis 12, and is an end plate in the arrangement.

Although not illustrated, it will be appreciated that the chassis 12 may be provided with a second auxiliary mounting arrangement similar to the first auxiliary mounting arrangement discussed above. The second auxiliary mounting arrangement may be provided at the second end of the chassis 12. In such arrangements, the second auxiliary mounting arrangement may be provided on the third arm 46. The second auxiliary mounting arrangement may be provided as to mount stabiliser legs or a dozer blade onto the chassis 12. In such arrangements, the first auxiliary mounting arrangement may be omitted.

The undercarriage 10 is configured to restrict relative movement between the third and fourth arms 46, 48. This arrangement helps to mitigate deformation of the chassis 12 (and in particular the third and fourth arms 46, 48), which may be caused by reaction forces imparted on the chassis 12 during working operations.

The undercarriage 10 is provided with a linkage member 42 extending between the third and fourth arms 46, 48 to restrict movement of the third and fourth arms 46, 48. Through this arrangement, the third and fourth cantilevered arms 46, 48 are secured together so as to prevent/minimise relative movement therebetween.

In the illustrated arrangement, in order to restrict movement of the third and fourth arms 46, 48 in a direction away from each other (i.e. to prevent movement increasing the separation between the third and fourth arms 46, 48), the linkage member 42 is configured to abut against outer surfaces of the third and fourth arms 46, 48. In this way, the linkage member 42 is configured to set a maximum separation/spacing between the third and fourth arms 46, 48.

The linkage member 42 is configured to mount the second axle 26 to the second axle mount 44. This provides a compact arrangement of the axle mounting arrangement by providing a single component that both mounts the second axle 26 to the chassis 12 and restricts relative movement between the third and fourth arms 46, 48. In the arrangement shown, the linkage member 42 extends through the second axle 26. The linkage member 42 is provided in the form of an axle pin in order to mount the second axle 26 to the chassis 12.

A first end of the linkage member 42 includes an abutment plate 56 for abutting against an outer surface of the third arm 46. The abutment plate 56 may also include one or more reinforcing ribs (not shown). A second end of the linkage member 42 is threaded for receiving a removable fastener 58, e.g. a locking nut, thereon for abutting against an outer surface of the fourth arm 48. The provision of a second abutment surface of the linkage 42 as a removable fastener 58 aids in the assembly/disassembly of an axle to the chassis 12. In alternative arrangements the linkage member 42 may not include the abutment plate and may instead include a removable fastener at both the first and second ends thereof. It will be appreciated that any suitable arrangement of linkage member 42 that is capable of restricting/limiting outward movement of the third and fourth arm 46, 48 may be used.

Figure 4:
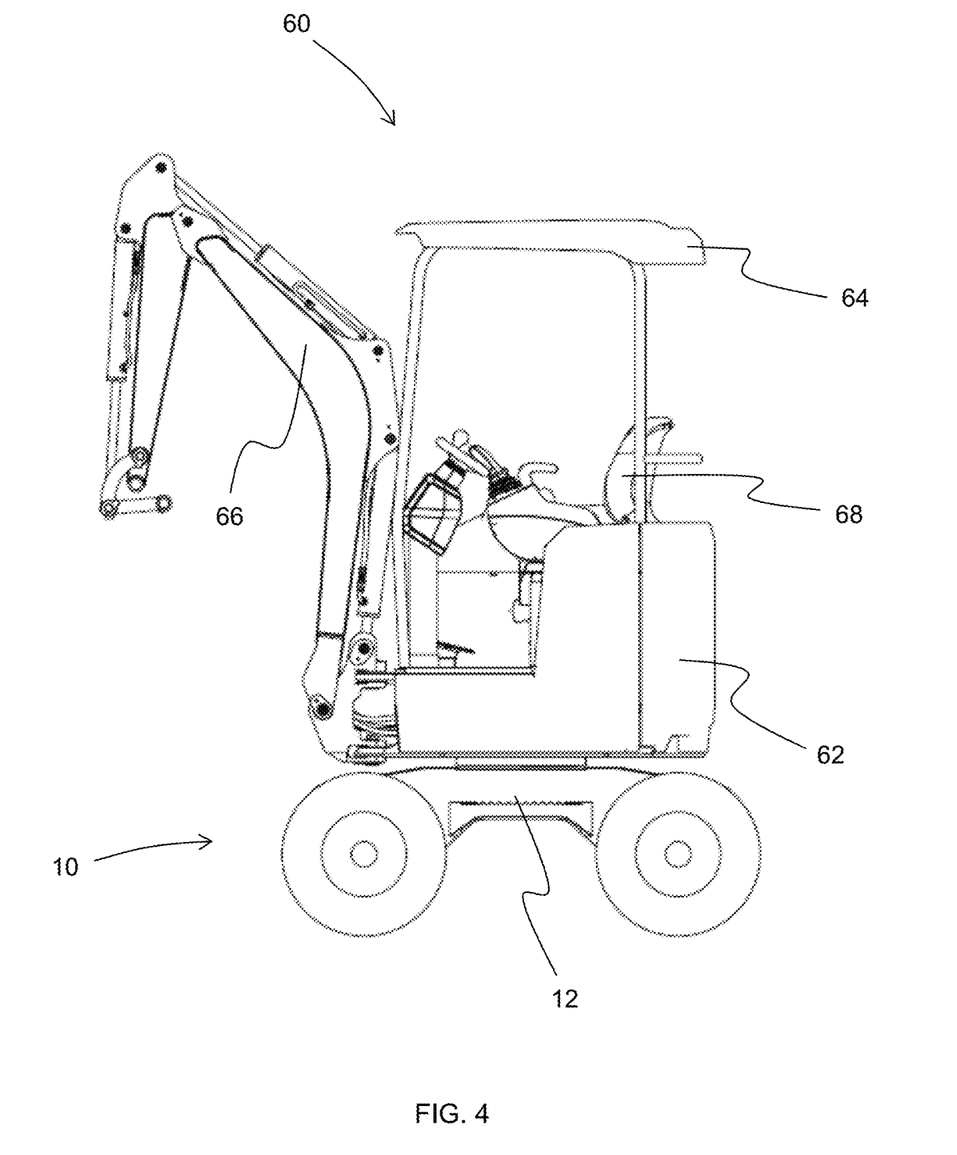
FIG. 4 is a side view of a working machine according to an embodiment.

Referring to FIG. 4, there is illustrated in somewhat simplified form a working machine 60. The working machine 60 is a wheeled working machine.

In the present embodiment, the working machine 60 may be considered to be a wheeled excavator (e.g. a wheeled mini excavator having an operating weight between 1.2 and 6 metric tonnes). The working machine 60 could be any type of wheeled working machine such as an excavator having any operating weight, a loader, a dumper, a forklift, a telehandler etc.

The working machine 60 includes an undercarriage 10 as described with reference to FIGS. 1 to 4. A superstructure 62 is connected to the undercarriage 10 by a mounting arrangement 14. In the arrangement shown, the mounting arrangement 14 is slewing mechanism in the form of a slewing ring. The mounting arrangement 14 permits unrestricted rotation of the superstructure 62 relative to the undercarriage 10 in this embodiment. A cab 64 from which an operator can operate the working machine 60 is mounted to the superstructure 62. The cab 64 includes an operator seat 68. It will be appreciated that in some arrangements, the working machine 60 may not include a cab 64 and the operator seat 68 may be directly connected on the undercarriage 10. A working arm arrangement 66 is rotatably mounted to the superstructure 62 and is provided for performing excavating operations.

Although the teachings have been described above with reference to one or more preferred embodiments, it will be appreciated that various changes or modifications may be made without departing from the scope as defined in the appended claims.

The invention claimed is:

1. An undercarriage for a working machine, the undercarriage comprising:
a chassis comprising a first axle mount; and
a first axle assembly mounted to the first axle mount, the first axle assembly comprising a first axle having first and second ends for pivotably mounting first and second wheels thereon,
wherein the first axle mount comprises first and second arms extending from the chassis to define a channel therebetween for receiving the first axle therein, and
wherein the undercarriage comprises a linkage member configured to restrict movement of the first and second arms, and
wherein the first arm is provided at or near a first end of the chassis and comprises an auxiliary mounting arrangement for mounting a dozer blade or stabiliser arms to the chassis.

2. The undercarriage according to claim 1, wherein the linkage member extends between the first and second arms to restrict movement of the first and second arms.

3. The undercarriage according to claim 2, wherein the linkage member is configured to abut against outer surfaces of the first and second arms.

4. The undercarriage according to claim 3, wherein the linkage member comprises an abutment plate for abutting against an outer surface of the first arm or second arm.

5. The undercarriage according to claim 3, wherein the linkage member comprises a threaded region for receiving a removable fastener thereon for abutting against an outer surface of the first arm or second arm.

6. The undercarriage according to claim 1, wherein the linkage member is configured to mount the first axle to the first axle mount, optionally wherein the linkage member releasably mounts the first axle to the first axle mount.

7. The undercarriage according to claim 1, wherein the linkage member extends through the first axle.

8. The undercarriage according to claim 1, wherein the linkage member is provided in the form of an axle pin.

9. The undercarriage according to claim 1, wherein the chassis comprises a second axle mount, and wherein the undercarriage comprises a second axle assembly mounted to the second axle mount, the second axle assembly comprising a second axle having first and second ends for pivotably mounting first and second wheels thereon.

10. The undercarriage according to claim 9, wherein the second axle mount comprises third and fourth arms extending from the chassis to define a channel therebetween for receiving the second axle therein, and wherein the undercarriage comprises a second linkage member configured to restrict movement of the third and fourth arms, optionally wherein the second linkage member extends between the third and fourth arms to restrict movement of the third and fourth arms.

11. The undercarriage according to claim 10, wherein the second linkage member is configured to mount the second axle to the second axle mount, optionally wherein the second linkage member releasably mounts the second axle to the second axle mount.

12. The undercarriage according to claim 10, wherein the second linkage member extends through the second axle.

13. The undercarriage according to claim 10, wherein the second linkage member is provided in the form of an axle pin.

14. The undercarriage according to claim 10, wherein the third arm is provided at or near a first end of the chassis and comprises an auxiliary mounting arrangement for mounting a dozer blade or stabiliser arms to the chassis.

15. An undercarriage for a working machine, the undercarriage comprising:
a chassis comprising a first axle mount; and
a first axle assembly mounted to the first axle mount, the first axle assembly comprising a first axle having first and second ends for pivotably mounting first and second wheels thereon,
wherein the first axle mount comprises first and second cantilevered arms extending from the chassis to define a channel therebetween for receiving the first axle therein,
wherein the undercarriage comprises a linkage member configured to restrict movement of the first and second arms,
wherein the linkage member extends between the first and second arms to restrict movement of the first and second arms, and
wherein the linkage member is configured to abut against outer surfaces of the first and second arms.

16. An undercarriage according to claim 15, wherein the linkage member comprises an abutment plate for abutting against an outer surface of the first arm or second arm.

17. An undercarriage according to claim 15, wherein the linkage member comprises a threaded region for receiving a removable fastener thereon for abutting against an outer surface of the first arm or second arm.

18. An undercarriage for a working machine, the undercarriage comprising:
a chassis comprising a first axle mount and a second axle mount;
a first axle assembly mounted to the first axle mount, the first axle assembly comprising a first axle having first and second ends for pivotably mounting first and second wheels thereon;
a second axle assembly mounted to the second axle mount, the second axle assembly comprising a second axle having first and second ends for pivotably mounting first and second wheels thereon,
wherein the first axle mount comprises first and second arms extending from the chassis to define a channel therebetween for receiving the first axle therein,
wherein the undercarriage comprises a linkage member configured to restrict movement of the first and second arms,
wherein the second axle mount comprises third and fourth arms extending from the chassis to define a channel therebetween for receiving the second axle therein, and
wherein the undercarriage comprises a second linkage member configured to restrict movement of the third and fourth arms.

19. An undercarriage according to claim 18, wherein the second axle mount comprises third and fourth arms extending from the chassis for receiving the second axle therein, wherein the third arm is provided at or near a first end of the chassis and comprises an auxiliary mounting arrangement for mounting a dozer blade or stabiliser arms to the chassis.

* * * * *

UNITED STATES PATENT AND TRADEMARK OFFICE
CERTIFICATE OF CORRECTION

| | |
|---|---|
| PATENT NO. | : 11,459,034 B2 |
| APPLICATION NO. | : 17/153860 |
| DATED | : October 4, 2022 |
| INVENTOR(S) | : Martyn Molsom et al. |

It is certified that error appears in the above-identified patent and that said Letters Patent is hereby corrected as shown below:

On the Title Page

Item (30) Foreign Application Priority Data should be added to read as follows:
-- January 20, 2020 (GB) 2000796 --.

Signed and Sealed this
First Day of October, 2024

Katherine Kelly Vidal
*Director of the United States Patent and Trademark Office*